United States Patent

[11] 3,583,168

| [72] | Inventor | Preston Horton<br>Killeen & Harker Heights, P.O. Box 2001,<br>Harker Heights, Tex. 76541 |
|---|---|---|
| [21] | Appl. No. | 816,547 |
| [22] | Filed | Apr. 16, 1969 |
| [45] | Patented | June 8, 1971 |

[54] BACKFILL AND PIPE LAYING ATTACHMENT FOR SIDE DISCHARGE TRENCHER
7 Claims, 6 Drawing Figs.

[52] U.S. Cl. .................................................. 61/72.1,
  37/142.5, 198/121, 214/83
[51] Int. Cl. ...................................................... F16l 1/00,
  E02f 5/12, B65p 1/00
[50] Field of Search.......................................... 61/72.1,
  72.5, .6, .7, .2, 63, 41; 37/142.5; 198/121; 214/83

[56] References Cited
UNITED STATES PATENTS

| 1,470,028 | 10/1923 | Parker | 61/725X |
| 1,589,091 | 6/1926 | Barber | 198/121X |
| 3,292,379 | 12/1966 | McElvany | 61/72.5 |

*Primary Examiner*—Jacob Shaprio
*Attorney*—John A. Mawhinney

ABSTRACT: A trailer for towing behind a trencher and including a longitudinally extending conveyor assembly inclined relative to the longitudinal centerline of the trailer with its forward end positioned to receive dirt being discharged from the side of the associated trencher. The trailer includes opposite side ground engaging wheels at its rear end for straddling a trench being dug by the trencher and the rear end of the conveyor assembly is supported for discharge of dirt being conveyed thereby into the trench straddled by the trailer.

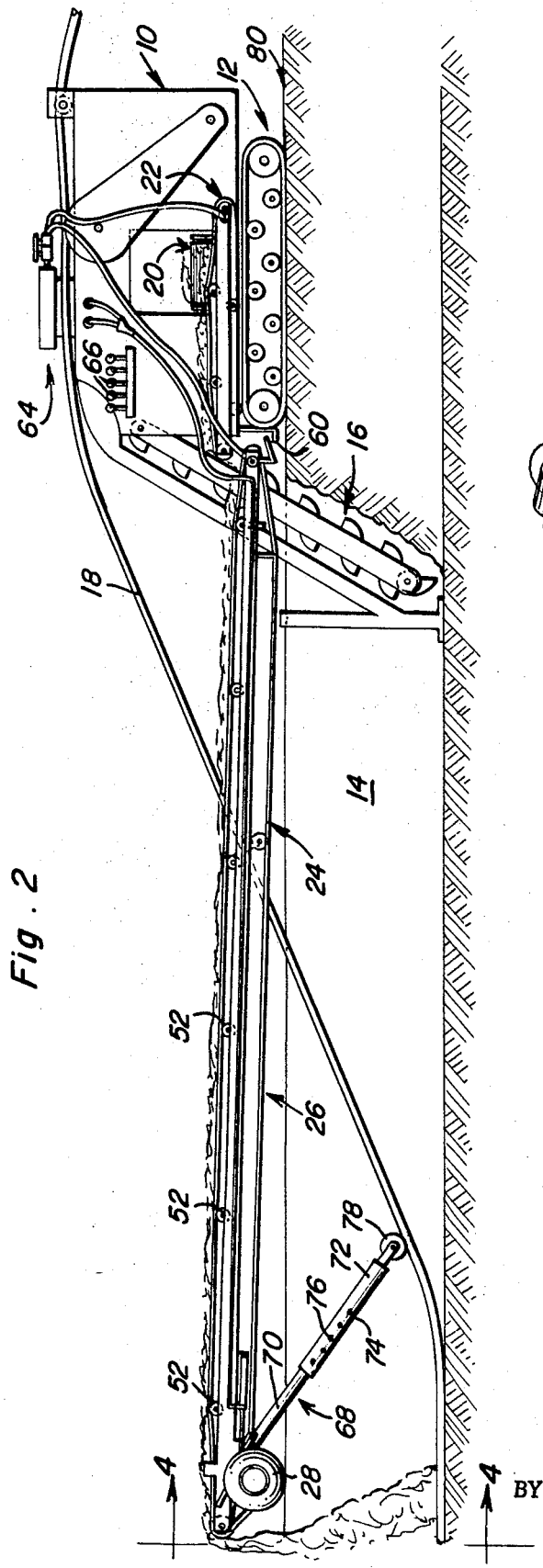
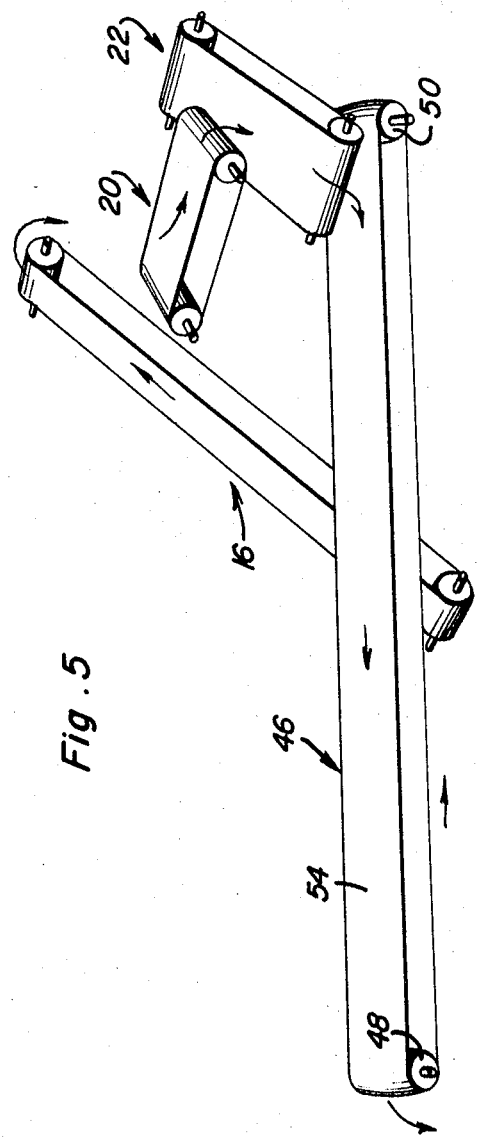
Fig. 2
Fig. 5
Preston Horton
INVENTOR
BY John A. Mawhinney
ATTORNEY

PATENTED JUN 8 1971

Preston Horton
INVENTOR

BY John A. Mawkinny
ATTORNEY

BACKFILL AND PIPE LAYING ATTACHMENT FOR SIDE DISCHARGE TRENCHER

The attachment of the instant invention has been designed to provide a means whereby a trench being dug for the reception of pipe therein may be backfilled behind the trencher and pipe being laid in the trench may be guided downwardly thereinto immediately forward of the area of the trench being backfilled. By providing a machine of this type a pipe-laying operation may be carried out by a single pass of equipment along the path of the desired pipeline.

The attachment of the instant invention is constructed in a manner whereby it may be readily trailed behind a trencher in operation with minimum drag on the trencher and the attachment includes a horizontal conveyor assembly which can be powered by a power source carried by the trencher.

The rear discharge end of the conveyor is shiftable transversely relative to the rear wheels of the trailer and the rear wheels of the trailer are steerable whereby the forward inlet end of the conveyor assembly may be spaced laterally of the trench being dug so as to be properly positioned to receive dirt from the trencher at the side discharge point thereof.

The main object of this invention is to provide an attachment for a trencher which may move along behind the latter and backfill a trench being dug by the trencher while at the same time laying pipe along the bottom of the trench.

Another object of this invention is to provide an attachment in accordance with the preceding object in the form of a trailer to be towed behind and therefore propelled by the associated trencher.

Still another object of this invention is to provide an attachment for a trencher in accordance with the preceding objects and including an elongated longitudinally extending conveyor assembly inclined slightly to one side at its forward end so as to be capable of receiving dirt discharged from one side of the associated trencher.

A further object of this invention is to provide the conveyor assembly of the trencher with fluid motor means therefor operable from a source of fluid under pressure carried by the trencher.

A final object of this invention to be specifically enumerated herein is to provide an attachment in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 2 is a side elevational view of the assemblage illustrated in FIG. 1 with the trencher and attachment illustrated in the process of digging a trench, laying a length of pipe in the trench and backfilling the trench behind the trencher;

FIG. 3 is an enlarged vertical sectional view taken substantially upon the plane indicated by the section line 3-3 of of FIG. 1;

FIG. 5 is a schematic view illustrating the passage of dirt being dug by the trencher, discharged onto the conveyor assembly of the attachment and discharged rearwardly off the rear end of the attachment.

Figure 1:
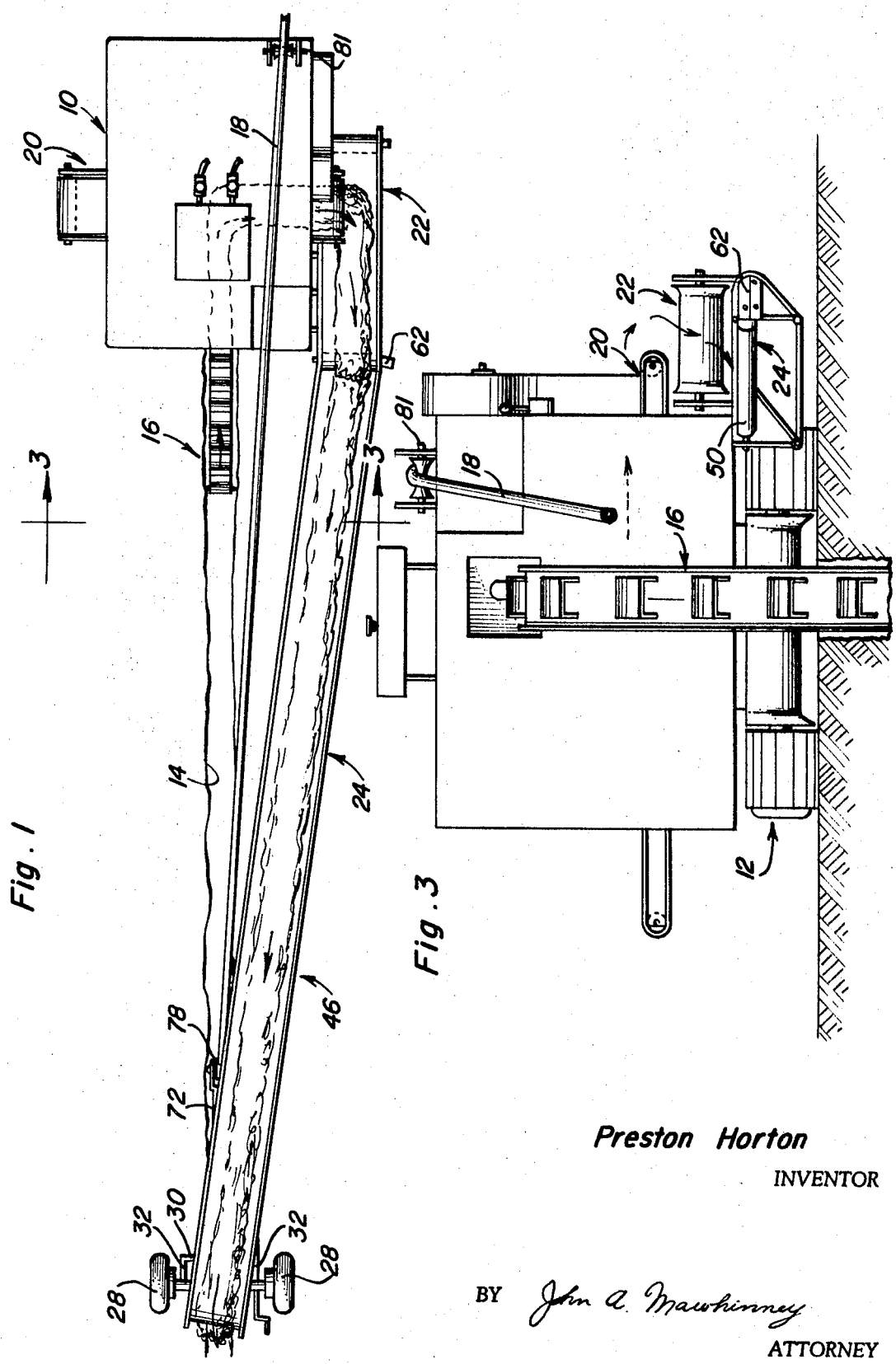
FIG. 1 is a top plan view of the backfill and the pipe laying attachment illustrated in operative association with a conventional form of side discharge trencher.

Referring now more specifically to the drawings, the numeral 10 generally designates a conventional form of trencher including endless track support and drive assemblies referred to in general by the reference numeral 12. The trencher 10 is illustrated in FIG. 2 of the drawings in the process of digging a trench 14 as it moves to the right and includes a depending trenching assembly referred to in general by the reference numeral 16 operable to dig the dirt from the ground in order to form the trench 14 as the trencher 10 moves forwardly. A long length of pipe 18 to be laid in the trench 14 is passed over the top of the trencher 10 and down behind the latter for laying along the bottom of the trench 14.

From FIG. 5 of the drawings it may be seen that the trencher 10 includes a transverse conveyor assembly referred to in general by the reference numeral 20 which receives dirt discharged from the upper end of the trenching assembly 16. The transverse conveyor assembly 20 conveys the dirt to the right side of the trencher 10 and discharges the dirt conveyed thereby from the right end of the conveyor assembly 20 onto a rearwardly directed conveyor assembly referred to in general by the reference numeral 22 and supported on the right side of the trencher 10. The dirt discharged onto the conveyor assembly 22 is then conveyed rearwardly to the rear end thereof and discharged therefrom.

The attachment of the instant invention is generally referred to by the reference numeral 24 and includes an elongated trailer frame referred to in general by the reference numeral 26 including rear opposite side dirigible ground-engaging support wheel assemblies 28 interconnected by means of a tie rod 30 pivotally connected between a pair of steering arms 32 mounted on the dirigible wheel assemblies 28 for oscillation therewith.

A rear transverse slide frame referred to in general by the reference numeral 34 extends between the dirigible wheel assemblies 28 and a carriage 36 is mounted on the slide frame for movement therealong between the wheel assemblies 28. A feed screw 38 is journaled from the frame 34 and threadedly engaged with the carriage 36 and therefore may be rotated in order to shift the carriage 36 transversely of the trailer frame 26 whose rear end is defined by the slide frame 34.

The carriage 36 includes a pivot pin 40 which projects upwardly therefrom and upon which a bifurcated turn table mount referred to in general by the reference numeral 42 is mounted. The mount 42 includes a pair of upwardly projecting support arms 44 and comprises the rear support of an elongated conveyor assembly referred to in general by the reference numeral 46. The conveyor assembly 46 includes a rear roller 48 as well as a forward roller 50 journaled at the front end of the trailer frame 26. In addition, a plurality of intermediate rollers 52 are spaced longitudinally along the frame 26 and an endless flexible belt 54 is trained about the rollers 48, 50 and 52.

A hydraulic cylinder referred to in general by the reference numeral 56 is operatively connected between the slide frame 34 and the tie rod 30 and may therefore be actuated to steer the wheel assemblies 28.

The trenching machine 10 is modified by the mounting of a swivel support 60 thereon, see FIG. 2, and the forward end of the trailer frame 26 is removably coupled to the swivel support 60, whereby the attachment 24 may be towed behind and thus propelled by the trencher 10 in a manner similar to the manner in which any type of trailer is towed behind a conventional vehicle. Of course, inasmuch as the wheel assemblies 28 are steerable, the rear end of the attachment 24 may be caused to track behind the trencher 10 as desired.

The forward end of the trailer frame 26 has a fluid motor 62, see FIG. 1, supported therefrom and the motor 62 is drivingly connected to the forward roller 50 of the conveyor assembly 46 and is therefore operative to cause the flexible belt 54 to move in the direction of the arrows illustrated in FIG. 5. Of course, the trencher 10 includes a hydraulic control system referred to in general by the reference numeral 64 and including numerous controls 66. The fluid motors 56 and 62 may be operatively coupled to the hydraulic system 64 for actuation thereby.

Figure 6:
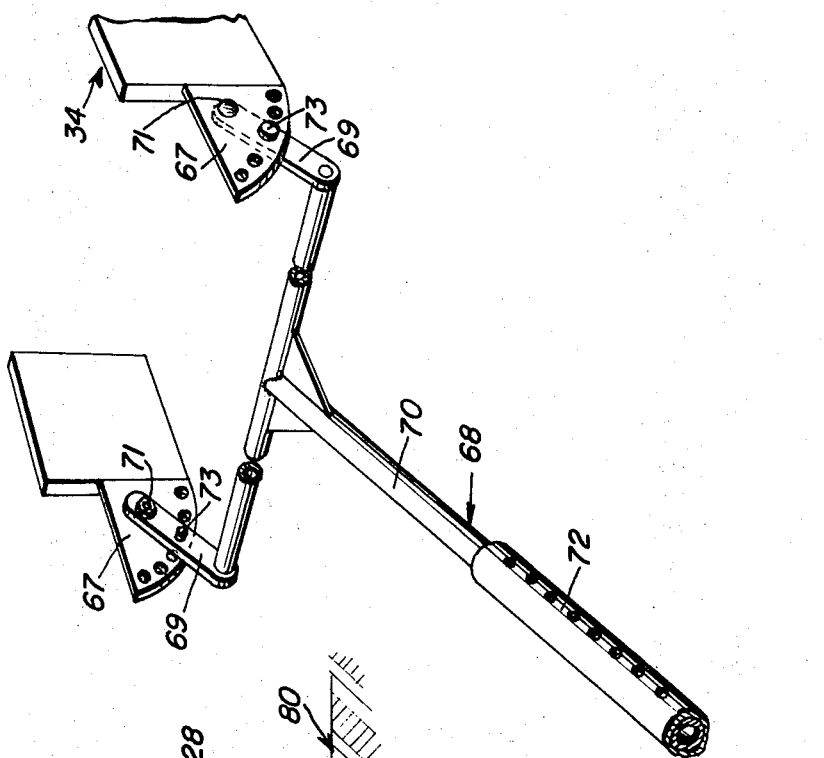
FIG. 6 is a fragmentary perspective view of the pipe or conduit-depressing portion of the attachment.
Figure 4:
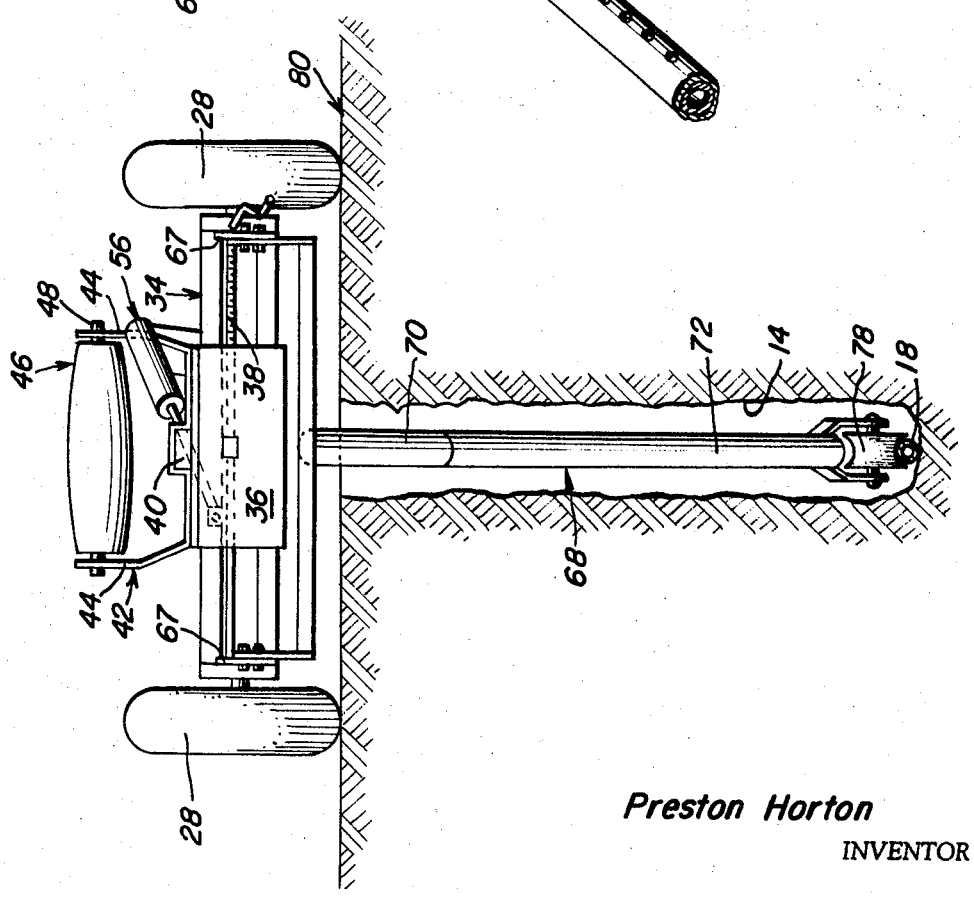
FIG. 4 is an enlarged vertical sectional view taken substantially upon the plane indicated by the section line 4-4.

The frame 34 includes opposite end mounting plates 67, see FIG. 6, and a forwardly and downwardly inclined arm referred to in general by the reference numeral 68 whose upper terminal end is bifurcated and has its furcations 69 pivotally supported from the frame plates 67 for adjustable positioning about a horizontal axis extending transversely of the trailer frame 26, by means of pivot fasteners 71. Further fasteners 73 are provided for retaining the arm 68 in adjusted positions relative to the plates 67.

The arm 68 includes an upper end portion 70 over which an extendable lower end portion 72 is telescoped. The lower end portion 72 includes longitudinally spaced apertures 74 through which a suitable fastener 76 may be secured, and the upper end portion 70 also includes apertures (not shown) formed in the lower end of the upper end portion 70, for securing the lower end 72 of the arm 68 in adjusted extended position. The lower end portion 72 of the arm 68 has a grooved roller 78 mounted thereon and the pipe 18 is passed beneath the roller 78 and is therefore urged downwardly into the bottom of the trench 14 by the roller 78 as the trencher 10 and the attachment 24 move along the ground in which the trench 14 is being formed.

If it is desired, the forward end of the conveyor assembly 46 may be positioned beneath the discharge end of the transverse conveyor assembly 20, thereby doing away with the need for the conveyor assembly 22.

In operation, the trencher 10 moves over the ground 80 and forms the trench 14 behind itself by means of the trenching assembly 16. The dirt dug from the ground to form the trench 14 is conveyed upwardly along the trenching assembly 16 and is then deposited, by gravity, onto the transverse conveyor assembly 20. The dirt is then discharged from the transverse conveyor assembly 20 onto the conveyor assembly 22, and then from the latter onto the conveyor assembly 46 for movement rearwardly along the open portion of the trench 14 to the rear end of the conveyor assembly 46 at which point the dirt drops by gravity into the open trench in order to backfill the latter. During this operation, the trencher 10 moves along beneath the pipe 18 and the grooved roller 78 presses down upon the pipe 18 behind the trencher 10 and forwardly of that portion of the trench 14 being back filled so as to urge the pipe 18 down into the bottom of the trench 14 before the backfill dirt is deposited on the pipe 18.

If it is desired, the front end of the attachment 24 may be provided with a single centrally disposed caster wheel assembly for support of at least a portion of the weight of the front end of the attachment from the ground. Also, the feed screw 38 may be provided with a reversible fluid-actuated drive motor for actuation from a remote location.

The trencher 10 includes a forward upper guide 81 through which the pipe 18 guidingly passes during forward movement of the trencher and the end rollers 48 and 50 of the conveyor assembly 46 are convexed, whereby the belt 54 is self-centering.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

I claim:

1. In combination, a trencher operable to move over the ground including digging means and dig a trench as the trencher proceeds in a forward direction, backfill means disposed to the rear of said trencher and operable to discharge dirt therefrom into a trench dug by said trencher at a point spaced behind the trencher, dirt conveying means operable to receive dirt from said digging means and convey the dirt received to said backfill means, said backfill means including a forwardly extending structure whose lower portion is operable to move through the trench dug by said digging means behind the latter and forwardly of the backfill means, said lower portion including guide means operable to lengthwise guidingly receive therepast a length of pipe to be laid in the bottom of said trench.

2. In combination, a side discharge trencher including discharge means on one side for discharging dirt dug by said trencher outwardly of said one side of said trencher, a trailer attached to the rear and trailerable behind said trencher, said trailer including spaced apart opposite side support wheel means for straddling a trench being dug by said trencher, an elongated longitudinally extending conveyor assembly supported from said trailer having a rear discharge end operable to discharge material downwardly therefrom into said trench behind said trencher, said conveyor assembly being forwardly angled outwardly to said one side of said trencher and positioned to receive dirt from said discharge means, said trailer including a forwardly and downwardly extending structure whose lower portion is disposed to the rear of said trencher and forward of said rear discharge end, said lower portion being operable to move through the trench dug by said digging means behind the latter and forwardly of the backfill means, said lower portion including guide means operable to lengthwise guidingly receive therepast a length of pipe to be laid in the bottom of said trench.

3. The combination of claim 2 wherein said rear discharge end of said conveyor assembly is supported from said trailer for adjustable lateral shifting relative to said wheel means.

4. The combination of claim 3 wherein said forwardly and downwardly extending structure is supported from said trailer against lateral shifting relative to said wheel means.

5. In combination, a side discharge trencher including discharge means on one side for discharging dirt dug by said trencher outwardly of said one side of said trencher, a trailer attached to the rear and trailerable behind said trencher, said trailer including spaced apart opposite side support wheel means for straddling a trench being dug by said trencher, an elongated longitudinally extending conveyor assembly supported from said trailer having a rear discharge end operable to discharge material downwardly therefrom into said trench behind said trencher, said conveyor assembly being forwardly angled outwardly to said one side of said trencher and positioned to receive dirt from said discharge means, said trailer including a forwardly and downwardly extending structure whose lower portion is disposed to the rear of said trencher and forward of said rear discharge end, said lower portion being operable to move through the trench dug by said digging means behind the latter and forwardly of the backfill means, said lower portion including guide means operable to lengthwise guidingly receive therepast a length of pipe to be laid in the bottom of said trench, the upper end of said forwardly and downwardly inclined structure being supported from said trailer for moving about a horizontal transverse axis, means operatively connected between said trailer and said inclined structure releasably retaining the latter in adjusted inclined position.

6. The combination of claim 5 wherein said inclined structure includes means for adjusting its effective length extending between said axis and said guide means.

7. The combination of claim 6 wherein said guide means comprises a flanged wheel journaled from the lower end of said inclined structure for rollingly engaging the upper surface portions of said pipe and depressing the latter downwardly into said trench.